D. M. GRAHAM.
STACKER.
APPLICATION FILED DEC. 19, 1912.

1,104,885.

Patented July 28, 1914.
4 SHEETS—SHEET 2.

Witnesses

D. M. Graham
Inventor,
by C. A. Snow & Co.
Attorneys.

D. M. GRAHAM.
STACKER.
APPLICATION FILED DEC. 19, 1912.
1,104,885.
Patented July 28, 1914.
4 SHEETS—SHEET 3.
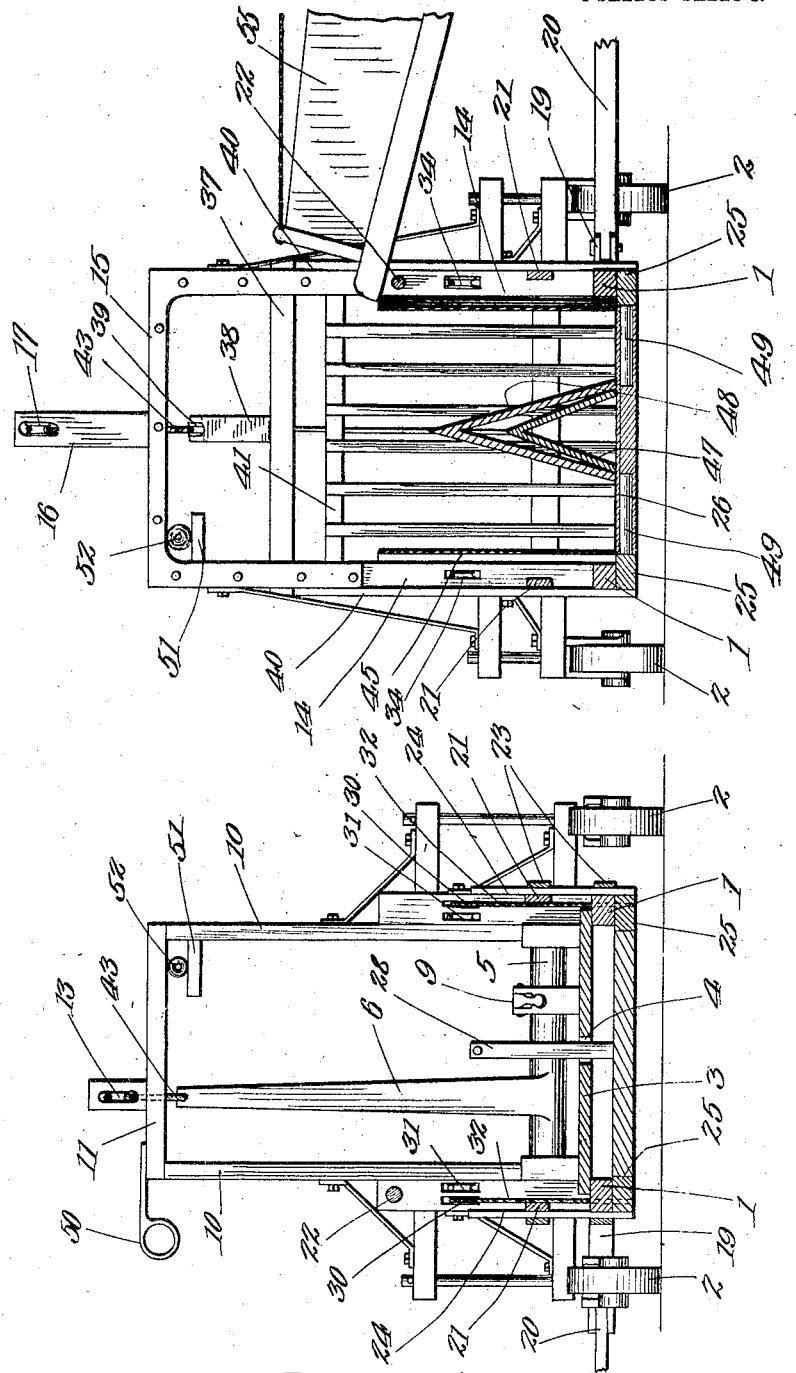
Witnesses
D. M. Graham, Inventor,
by C. A. Snow & Co.,
Attorneys.

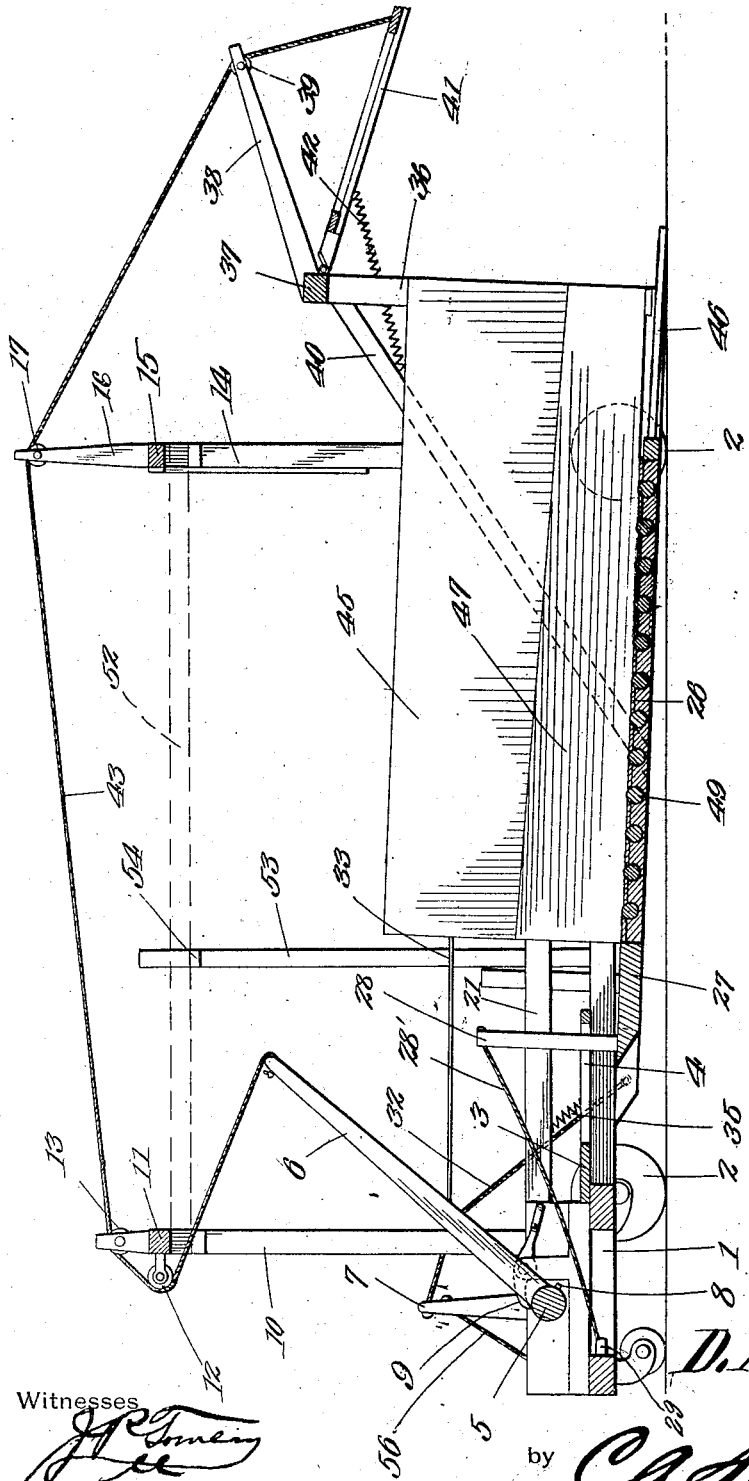

UNITED STATES PATENT OFFICE.

DAVID M. GRAHAM, OF BORDULAC, NORTH DAKOTA, ASSIGNOR OF ONE-HALF TO E. A. ROACH, OF BORDULAC, NORTH DAKOTA.

STACKER.

1,104,885.

Specification of Letters Patent.

Patented July 28, 1914.

Application filed December 19, 1912. Serial No. 737,743.

*To all whom it may concern:*

Be it known that I, DAVID M. GRAHAM, a citizen of the United States, residing at Bordulac, in the county of Foster and State of North Dakota, have invented a new and useful Stacker, of which the following is a specification.

This invention relates to machines for stacking grain, one of its objects being to provide a machine of this character adapted to travel alongside of a harvester and to receive the cut grain therefrom, means being provided whereby the grain, after it has accumulated to form a stack of desired bulk, can be deposited on the ground A further object is to provide means whereby an opening may be left under the stack for the purpose of affording ventilation of the grain.

Another object is to provide means whereby the accumulated grain can be deposited on the ground in a stack, the said stack being left intact, the stack forming means being so shaped as to withdraw easily from the deposited stack.

Another object is to provide a machine of this character which is simple in construction and which is at all times under the control of a single operator.

Heretofore, in harvesting grain, it has been customary to utilize binding mechanism at one side of the harvester, this mechanism gathering the grain into bundles and tying it, the bundles being subsequently thrown to the ground.

The present invention has for its object to eliminate the binder and consequently save the cost of the twine commonly employed and which is an expensive item in the harvesting of grain, it being possible, by the use of the present machine, to readily collect the harvested grain without the employment of any more power or labor than has heretofore been necessary and at the same time eliminating the cost of the twine, as heretofore stated.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
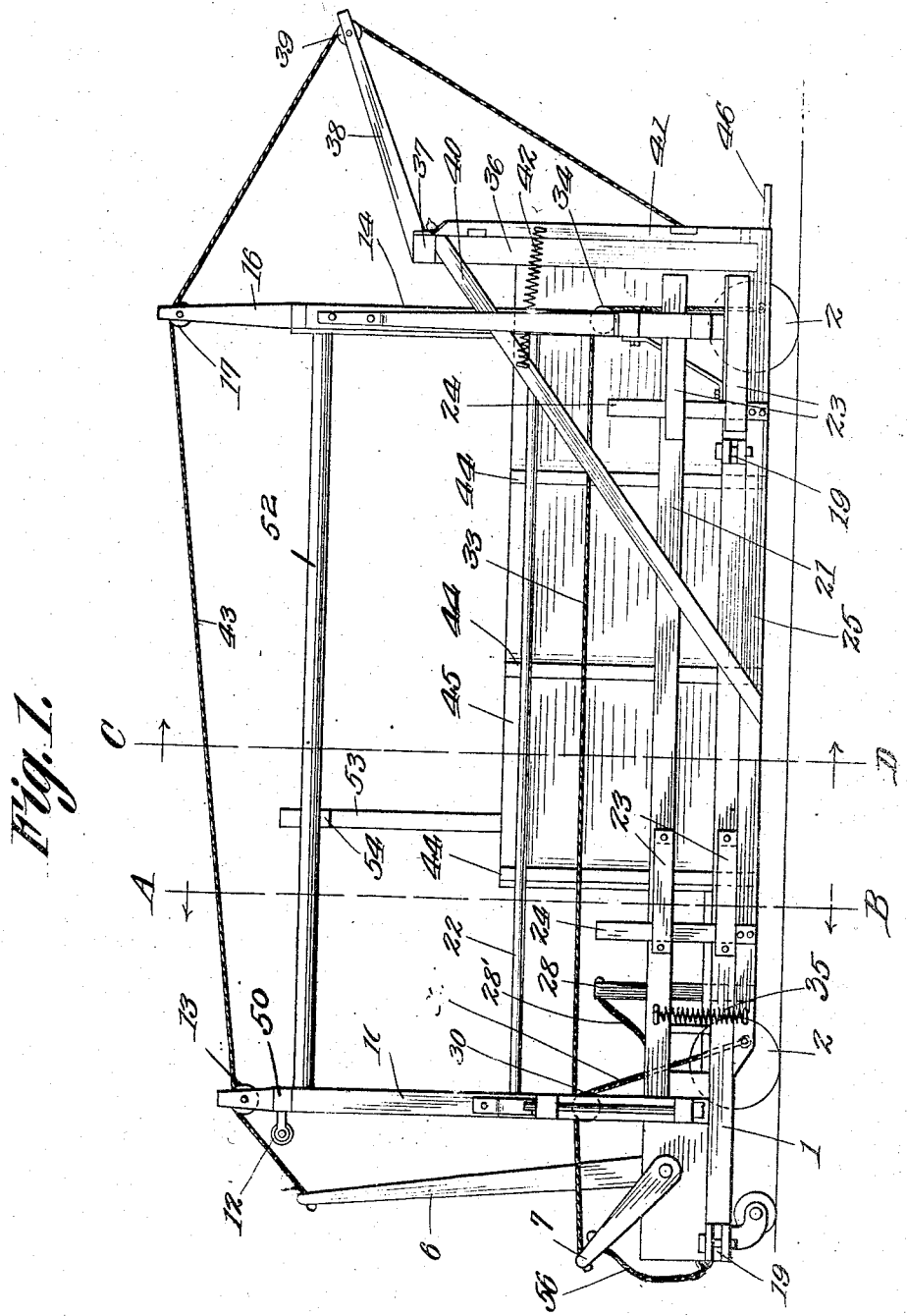
Figure 2:
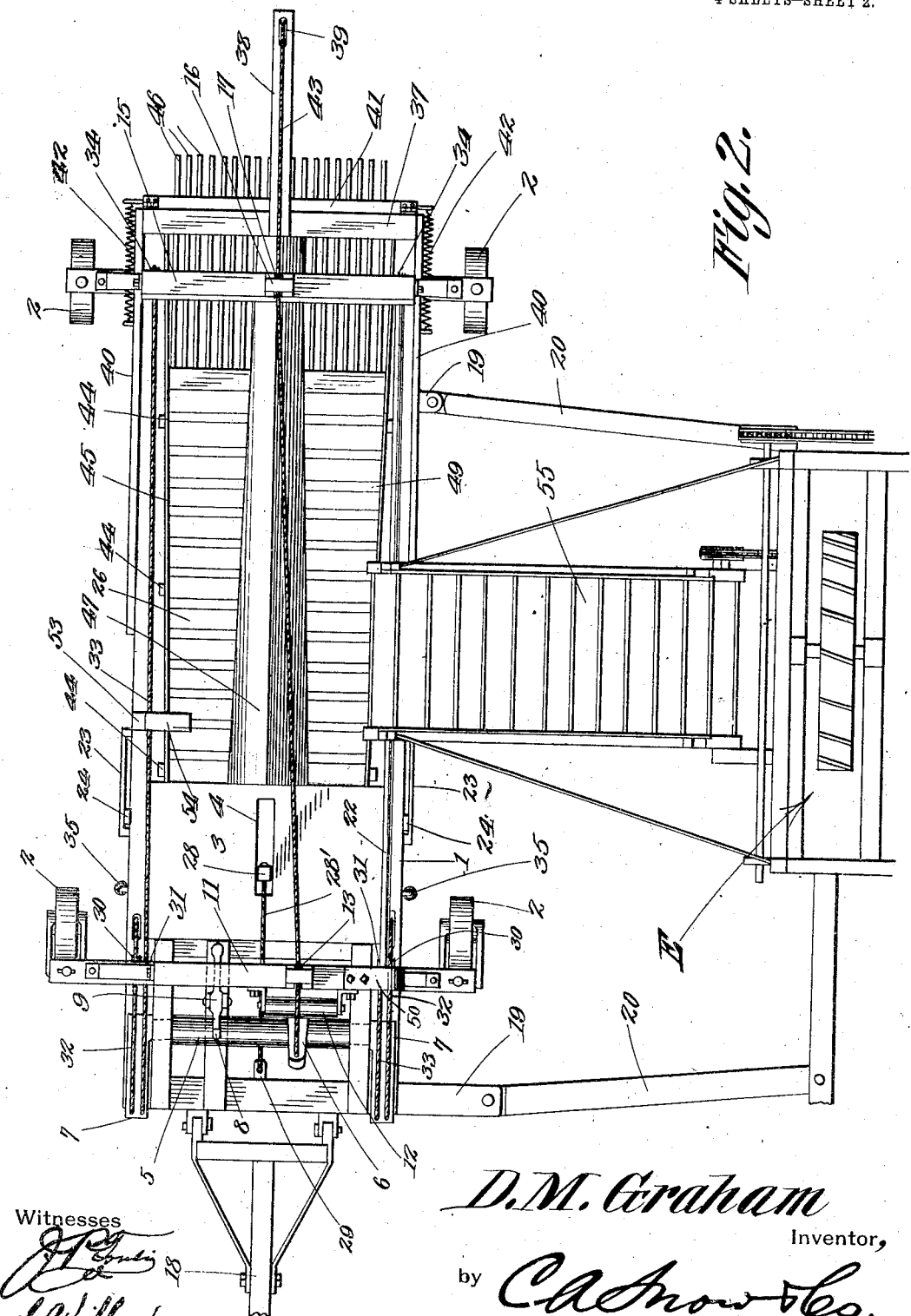

In said drawings—Figure 1 is a side elevation of the machine. Fig. 2 is a plan view thereof, the same being shown coupled to a portion of a harvesting machine, the roller protecting material being removed for the purpose of clearness. Fig. 3 is a section on line A—B Fig. 1. Fig. 4 is a section on line C—D Fig. 1. Fig. 5 is a longitudinal section through the machine, the parts being shown in stack releasing position.

Referring to the figures by characters of reference 1 designates the side beams of a wheel supported main structure, the supporting wheels being indicated at 2. These beams are connected, near their front ends, by a platform 3 in which is formed a slot 4. A shaft 5 is mounted for rotation above the front portion of the main frame and is provided with an upwardly extending elongated intermediate arm 6 while additional shorter arms 7 are mounted upon the end portions of the shaft. A tooth 8 or other suitable projection is formed on the shaft 5 and is normally engaged by a dog 9 which may be in the form of a foot actuated lever. Thus it will be seen that the tooth and dog coöperate to hold the shaft normally against rotation in one direction.

Standards 10 extend from the front end portions of the side beams 1 and are connected, at their upper ends, by a cross beam 11 on the front face of which is mounted a guide roller 12. A sheave 13 is supported upon the cross beam 11 above and back of the guide roller 12. Extending upwardly from the rear end portions of the side beams 1 are additional standards 14 connected at their upper ends by a cross beam 15 on which is arranged a post 16 carrying a sheave 17. It is to be understood of course that instead of providing standards 10 and 14 on which cross beams are mounted, each pair of standards and the cross beam thereon can be formed integral or, in other words, can be made in the form of an arch bridging the space between the sides of the main frame.

A draft tongue 18 can be connected in any suitable manner to the front end of the main frame and arms 19 may be extended laterally from one of the side beams so as to be engaged by coupling links 20 adapted to be pivotally connected to one side of a harvester structure, a portion of which has been shown at E.

Secured to the standards 10 and 14 near their lower ends, are side strips 21 which are spaced from but parallel with the beams 1. Additional connecting means, such as rods 22, may be arranged along the sides of the machine, these rods being attached at their ends to the standards 10 and 14.

Secured to the outer sides of the beams 1 and side strips 21 are elongated guide straps or the like indicated at 23, these straps being arranged in pairs, one pair being located adjacent the rear end of each side of the main frame and another pair being located adjacent the rear portion of each side of the platform 3. The guides of each pair are disposed one directly above the other and each pair of guides is adapted to receive a guide arm 24 extending upwardly from one side of a runner 25. Two of these runners are used and the same are extended longitudinally under the side beams 1 and have their upper faces connected preferably by means of a sheet metal floor 26 forming the base of the grain rack. Any other suitable connections can also be provided between the runners and below the sheet metal floor 26, these connections being in the form of boards 27 or the like, arranged between the runners. The front end portion of the rack is extended under the platform 3 and has a central arm 28 extending upwardly therefrom and loosely through the slot 4 in the platform. A chain, cable, or other suitable flexible element 28' is secured at one end to this arm 28 and at its other end to the front end of the main frame, this connection being indicated at 29. The said connection is normally slack and the arm 28 is normally positioned within the front end portion of the slot 4. A pair of guide sheaves 30 and 31 is carried by each of the front standards 10 and one of these sheaves, 30, is engaged by a chain, cable or other suitable flexible element indicated at 32, one end of this element being attached to one of the end arms 7 while the other end of said element is attached to the front end portion of the adjacent runner 25. Additional flexible elements 33 are attached to the arms 7 and extend over the sheaves 31 and rearwardly over sheaves 34 carried by the standards 14. From these sheaves 34 the said flexible elements 33 extend downwardly to the rear end portions of the runners 25. These flexible elements 32 and 33 are of such length as to hold the runners tightly against the lower faces of the side beams 1 when the arms 7 are locked in their forward position by dog 9 engaging the tooth 8. Coiled springs 35 extend upwardly from the front end portions of the runners 25 and are attached to the side strips 21.

Posts 36 extend upwardly from the rear end portions of the runners 25 and back of the side beams 1 and are connected by a top beam 37 from which extends an upwardly and rearwardly inclined arm 38. This arm carries a guide sheave 39. Suitable braces 40 may connect the upper end portions of the posts 36 to the sides of the runners 25.

A gate 41 is hingedly connected to the top beam 37 and is held normally shut against the posts 36 by coiled springs 42, these springs being attached preferably to the braces 40. A cable, chain, or other suitable flexible element, indicated at 43 is attached at one end to the gate 41 near the bottom of the gate and this element extends upwardly to the guide sheave 39, thence forwardly over the sheave 17 and longitudinally of the machine to the sheave 13. From this sheave the flexible element 43 is extended downwardly in front of the roller 12 and is secured to the upper end of the elongated intermediate arm 6. This arm is normally extended upwardly toward the roller and, when it is thus positioned, the springs 42 hold the gate 41 closed against the posts 36.

Extending upwardly from the rack and between and close to the side beams 1 are stanchions 44 to the inner sides of which are attached the side walls 45 of the rack, these side walls being preferably formed of sheet metal and being also secured, at their rear ends, to the inner sides of the posts 36. The said side walls diverge rearwardly and are perpendicular to the floor 26. Extending rearwardly from the rear edge of floor 26 are spring rods 46, these rods projecting rearwardly a short distance beyond the bottom of the gate 41 when said gate is in closed position.

Secured along the center of the floor 26 and extending upwardly therefrom, is a longitudinally extending member 47 which is V-shaped in cross section and gradually decreases in cross sectional area from its front to its rear end, said member being extended throughout the length of the floor 26 and up to the plane occupied by the gate when it is closed. The said member 47 does not contact with the rods 46 thereunder but is spaced therefrom so as not to interfere with the flexing of the rods during the dumping operation hereinafter described. This member 47 constitutes means for forming an air space within a stack which has been deposited on the ground. Some grain requires the formation of a larger air space than does other grain. It has therefore been found desirable to combine with the member 47 a supplemental removable member 48 which extends longitudinally of and straddles the member 47. When a large air space is to be formed, this supplemental member 48 is left in position on the floor 26 and astride the member 47. When, however, a smaller air space is to be provided, the supplemental member 48 may be removed. Furthermore, if desired, rollers such as indicated at 49 may be seated in the floor 26, these rollers extending transversely of the floor so as to reduce friction to the minimum and thus expedite the withdrawal of the rack from the deposited stack, as will be hereinafter explained. These rollers, however, are not necessarily used as, under ordinary conditions, the sheet metal floor will be sufficiently smooth to withdraw readily from under the deposited stack.

It has, heretofore, been the practice to use four horses for pulling the harvesting and binding mechanism such as ordinarily used. As hereinbefore stated, the use of the stack forming machine constituting the present invention, obviates the necessity of employing a binder and, consequently, the harvesting mechanism can be drawn by three horses. The fourth horse can be used in connection with an additional one for drawing the stack forming machine constituting the present invention. All of the horses, to wit, those drawing the harvesting mechanism, and those drawing the stack forming machine, are driven by a person seated on the harvester, the lines leading to the horses in front of the stack forming machine, being extended through a guide arm 50 extending laterally from one of the front standards 10.

Racks or brackets 51 are extended inwardly from the upper ends of the standards 10 and 14 at one side of the machine and serve to support a roll of canvas or other protecting material such as indicated at 52. A supplemental post 53 having an additional bracket 54 can be located between the standards 10 and 14 for holding the roll 52 at an intermediate point.

As hereinbefore stated, under normal conditions the runners 25 are held against the lower sides of the beams 1 by the flexible connections 32 and 33, said connections being held taut by the dog 9 engaging the tooth 8. Furthermore the gate 41 is held yieldingly against the posts 36 and the guide arms are extended upwardly close to the front end portions of the straps 23 while the central arm 28 is extended upwardly within the front end portion of the slot 4. An elevator 55 is extended upwardly from one side of the harvester and overhangs the floor of the rack, this elevator being so located as to receive the cut grain and carry it upwardly so that the grain will be discharged onto the rack between the side walls 45. This operation takes place during the forward movement of the harvester and of the stack forming machine which constitutes the present invention. As the grain is deposited on the rack, a man who is located on the rack, distributes the grain over the floor of the rack so that the grain ultimately becomes piled upon the rack and between the walls 45 to a desired height. After a sufficient amount of grain has thus been accumulated, the roll 52 is removed from the brackets 51 and 54 and spread out over the grain, the edge portions of the protecting fabric constituting the roll being anchored to the ends and sides of the stack of grain in any preferred manner. After the protecting fabric has been placed in position, the operator depresses one end of the dog 9, thus releasing the tooth 8 and permitting shaft 5 to rotate. This rotation will occur promptly, the weight of the runners 25, the floor 26, and the load upon the floor, serving to cause the rack to gravitate to the ground. As the rear end of the rack is not provided with any supporting springs such as have been indicated at 35, said rear end of the rack will drop promptly onto the ground, the spring rods 46 striking the ground and flexing under the weight to which they are subjected. Simultaneously with the downward movement of the rack, the elongated intermediate arm 6 on shaft 5 swings rearwardly and pulls on the flexible connection 43 which, in turn, swings the gate 41 rearwardly and upwardly to open position and against the stress of its springs 42. This operation of the gate is effected by the weight of the load moving downwardly and which obviously causes the connections 32 and 33 to pull on arms 7 and thus rotate shaft 5 so as to swing the arm 6 rearwardly.

In order to produce a period of rest for the stack immediately subsequent to its gravitation to its lowermost position and prior to the withdrawal of the rack therefrom, the elongated guide straps 23 and the slot 4 have been provided. Thus it will be seen that as soon as the rear end portion of the rack strikes the ground, the main frame of the machine will continue to move forward while the rack will remain stationary until the rear wall of slot 4 comes against the arm 28 and the rear ends of the guide straps 23 come against the arms 24. At this time the rack will be started forward suddenly with the moving main frame and the rearwardly diverging walls of the rack will move forwardly away from the sides of the stack while the smooth bottom or floor 26 will slide from under the stack. Simultaneously with this operation, the V-shaped member 47 or 48, or both of them, will withdraw from the stack, thus leaving a continuous air space under the stack, this withdrawal being rendered possible in an efficient manner by reason of the fact that the members 47 and 48 are gradually reduced in transverse area toward their rear ends. As soon as the rack passes from under the deposited stack, the operator pushes forward on the intermediate arm 6 until the tooth 8 again becomes engaged by the dog 9. This rotation of shaft 5 by means of arm 6 results in the connections 32 and 33 pulling the rack upwardly so as to bring its runners against the lower sides of the side beams 1 and in releasing gate 41 so that its springs will return the gate to closed position. Thus the machine becomes reset and the foregoing operation can be repeated.

Importance is attached to the fact that during the dumping operation the rear end of the rack first drops and, as soon as the flexible rods 46 strike the ground, the front end of the rack likewise moves downwardly against the stress of springs 35. Thus the sudden forward movement of the stack which would ordinarily be produced when the rack is brought to a sudden stop, is offset and the stack, when the rack is dropped and momentarily held stationary, remains intact, and will not fall forwardly. Furthermore by having the side walls diverging rearwardly and by having the central air space forming members with sides converging rearwardly, the rack will withdraw from the stack without pulling it to pieces.

It has been found that by using a machine such as herein described, the grain can be harvested with practically no loss and, at the same time, with a saving of the cost of twine such as commonly used. When the stacks are left in the field, they remain thoroughly ventilated and can be subsequently readily removed by a machine provided for that purpose.

It will be noted that the flexible connection 28' extends downwardly and forwardly from the arm 28. Thus it will be seen that during the independent forward movement of the main structure while the rack is in contact with the ground, this connection will pull downwardly on the arm 28 and cause the front end of the rack to swing downwardly against the action of the springs 35.

As shown in the drawings the rearward movement of the arms 6 and 7 can be limited by chains, cables, or other flexible elements 56 attached to the arms 7 and to the front ends of the beams 1.

What is claimed is:—

1. A machine for forming stacks of grain, including a movably supported main structure, a rack, means for holding the rack in raised position, said rack when released, being adapted to gravitate into contact with the ground, and slidable connections between the rack and main structure whereby a momentary forward movement of the main structure is permitted independently of the rack.

2. A machine for forming stacks of grain, including a movably supported main structure, a rack, means connected to the end portions of the rack for holding it normally in raised position, yielding connections between the front end of the rack and the main structure, and means for successively depositing the back and front ends of the rack upon the ground.

3. A machine for forming stacks of grain, including a movably supported main structure, a rack, means for holding the rack normally elevated, means for releasing the holding means to deposit the rack upon the ground, and yielding means for retarding the gravitation of the front end of the rack.

4. A machine for forming stacks of grain, including a movably supported main structure, a rack, means for supporting the rack in raised position, said rack, when released, being adapted to gravitate into contact with the ground, and slidable connections between the rack and main structure whereby a momentary forward movement of the main structure independently of the rack is permitted subsequent to the gravitation of the rack.

5. A stack forming machine including a movably supported main structure, a rack, means for normally supporting the rack in elevated position, said means, when released, permitting gravitation of the rack into contact with the ground, means for retarding the gravitation of the front end of the rack, and means for permitting a momentary halt in the forward movement of the rack during the gravitation of said rack and during the forward movement of the main structure.

6. A stack forming machine including a movably supported main structure, a longitudinally slotted platform, guide members upon the sides of the structure, runners, a floor connecting the runners, said runners and floor constituting a rack, means for holding the rack in elevated position, and arms upstanding from the rack and slidably mounted within the slot and guides respectively.

7. A stack forming machine including a movably supported main structure, a longitudinally slotted platform, guide members upon the sides of the structure, runners, a floor connecting the runners, said runners and floor constituting a rack, means for holding the rack in elevated position, arms upstanding from the rack and slidably mounted within the slot and guides respectively, and flexible means connecting one of the arms to the front end of the main structure for limiting the movement of the rack in one direction relative to said structure.

8. A stack forming machine including a movably supported main structure, a platform, guide members upon the sides of the structure, runners, a floor connecting the runners, said runners and floor constituting a rack, means for holding the rack in elevated position, and coöperating means upon the rack and main structure for depressing the forward end of the rack during the discharge of the load therefrom.

9. A stack forming machine including a movably supported main structure, a platform, runners, a floor connecting the runners and coöperating therewith to form a rack, means for yieldingly supporting the front end portion of the rack, means for supporting the rear end portion of the rack, a gate closing the space above the rear end portion of the rack, and means operated by the release of the rack, for opening the gate during the downward movement of the rack relative to the main structure.

In testimony that I claim the foregoing as my own, I have hereto affixed my signature in the presence of two witnesses.

DAVID M. GRAHAM.

Witnesses:
 SELINA WILLSON,
 I. E. SIMPSON.

Copies of this patent may be obtained for five cents each, by addressing the "Commissioner of Patents, Washington, D. C."